US005782639A

United States Patent [19]

Beal

[11] Patent Number: 5,782,639
[45] Date of Patent: Jul. 21, 1998

[54] MANUAL MOTION SIMULATOR WITH RESISTANCE AND VIDEO

[76] Inventor: Robert Austen Beal, 7757 Pierson St., Arvada, Colo. 80005

[21] Appl. No.: 720,667

[22] Filed: Oct. 2, 1996

[51] Int. Cl.[6] .................................. G09B 9/02; G09B 9/12
[52] U.S. Cl. ........................... 434/29; 434/58; 472/130; 482/96; 482/902
[58] Field of Search .................. 434/29, 30, 33, 434/34, 45, 55, 58, 59, 60–62; 482/1, 9, 51, 902, 95, 96; 472/130

[56] References Cited

U.S. PATENT DOCUMENTS

| | | | |
|---|---|---|---|
| 3,805,413 | 4/1974 | Burny et al. | 434/45 |
| 4,711,447 | 12/1987 | Mansfield | 482/902 |
| 4,978,299 | 12/1990 | Denne | 434/58 |
| 5,431,569 | 7/1995 | Simpkins et al. | 434/59 X |

Primary Examiner—Richard J. Apley
Assistant Examiner—John Mulcahy
Attorney, Agent, or Firm—Workman, Nydegger & Seeley

[57] ABSTRACT

A manually operated motion device for user interactive motion of a motion surface. The motion device includes a motion surface with a support points in a substantially triangular arrangement and that are used to support the motion platform in a substantially parallel relationship to the floor by a pair of support members attached to universal hinges on the motion surface and a compression member which connects to a universal hinge on the motion surface and may move in a substantially vertical plane that bisects the triangular arrangement of the support points on the motion surface. Attached to the supports is at least one mechanism for manually moving at least one of the support members, so that motion of one support member allows motion of the motion surface.

12 Claims, 8 Drawing Sheets

Fig 4h
DL  N  DRT

MANUAL MOTION SIMULATOR WITH RESISTANCE AND VIDEO

CROSS-REFERENCES TO RELATED APPLICATIONS

This application claims the benefit of U.S. Provisional Application Ser. No. 60/004,893 filed Oct. 6, 1995, and now abandoned.

BACKGROUND

1. Field of Invention

This invention relates to motion simulators, specifically to motion simulators that can be manually operated.

BACKGROUND

2. Discussion of Prior Art

There is nothing like the thrill and adventure of a good roller coaster, a fact amusement parks have capitalized on for years. It's as if you were experiencing a simulation of a stunt plane, diving and turning, then climbing and diving again.

The thrill can be broken down into the fundamental forces of motion, and the bodies senses. These two components constantly look to each other for verification. If a user stands with his or her eyes closed and feels like he or she is slowly spinning he or she will immediately open the his or her eyes to verify this fact. If the user still feels like he or she is spinning and the user's brain tells him or her that they are not, the user will begin to feel motion sickness. These two powerful components are the backbone of faking reality in a simulation.

Force with movement is the first component of a simulation. Direction and momentum are the natural elements that the applied force must act against. To change the direction of a moving object, force must be applied to the object in the direction that one wants to direct it. To change the momentum of an object force must be applied to it. These are the forces we feel when the object is the human body. The brain associates these forces with motion.

When a thrill seeker boards the roller coaster the user sits in a still car. When the car begins to speed foreword, the seat back applies force to the users back and pushes the user foreword. As the user starts to ascend the first incline, the users direction is changed upward. This is done as the car pitches upward and the seat bottom pushes up against the user. Starting down the other side the car pitches downward, the seat drops out from under the user, and gravity pulls the user down toward the ground. Through the turns, the car applies the necessary force to the users sides to change the users direction.

Since most simulators are stationary and have no momentum, they must produce a force that moves the user to simulate a change in direction or momentum. The most basic forces or movements of a simulator are, pitch, (tilting up or down as in a dive or climb), roll, (rolling sideways to the left or right), and yaw (turning left or right). A more sophisticated simulator will also be capable of vertical, lateral, and longitudinal displacement, providing a full six degrees of freedom.

The second component consists of the brain's interpretations of the bodies senses. The motion sensing capabilities of the inner ear and our vision are foremost. Sound also has a powerful influence in our interpretation of reality. Lastly, touch or tactile sensation is most often the final proof in establishing reality.

When the rider of the roller coaster starts to move, the inner ear registers all the movements. As the rider accelerates foreword he or she sees the surrounding scenery progress toward him or her and the things that are close pass by. If the rider turns the his or her head to the right, the scenery visually moves from left to right. At a turn or incline the motion sensing center in the inner ear registers movement to the brain. Noises move from the front to the rear, and the vibrations and jolts from the wheels against the track are transmitted through the car and are felt by the rider.

A simulator usually incorporates enough visual imagery through video screens and instrumentation to resemble the real vehicle being simulated, as well as to give the user a sense of immersion. Sound incorporated through loud speakers or headphones replicates the audible surroundings of the simulated vehicle. In a more sophisticated simulation tactile sensation will be stimulated through the use of subwoofer audio drivers, or vibration generators mounted to the simulator chassis.

It is the sum of these components working together that we interpret as reality. Motion simulators are the tool we use to reproduce them.

MOTION SIMULATORS

Heretofore there have been many varieties of motion simulators that have tried to reproduce these components. The most obvious is the modern flight simulator which uses hydraulic actuators to maneuver a motion surface according to instructions from a computer control. They also provide a good video representation of what they are feeling and good corresponding sound. Motion simulators of any kind are very complex pieces of machinery, using hydraulics, position sensors, and powerful computerized controllers. Simulators seem to be getting more complex and specialized as time goes by. But this complexity results in very high production costs, and decreased dependability.

A simpler approach was accomplished by French, U.S. Pat. No. 2,551,574 which teaches a video display and seat that moves according to input from a control device to simulate flying. The motion simulator is moved by two electric actuators providing pitch and roll. This design can not simulate yaw, or vertical, lateral, and longitudinal displacement.

Unfortunately, with such automated complexity as the trend, there is no such thing as a motion simulator that is manual and can be used at home with a common personal computer. And worse no one teaches a way to accomplish this while providing a realistic representation of the full spectrum of encountered forces.

Motion simulators have also been adapted and used as training simulators for land vehicles. These are again designed for a specific vehicle with the appropriate controls and instrumentation.

In all cases the simulators are dedicated to a certain type of vehicle and its controls. The benefits of the simulators are limited to reproducing the environment and providing vehicle specific training. In the past access to one of these simulators for public recreational purposes was very costly at best but more commonly non existent.

All simulators heretofore known, suffer from a number of disadvantages:

(a) they can't be controlled manually without the aid of automation;

(b) they are cost prohibitive for the consumer market;

(c) they are replicas of one type of vehicle;

(d) they require powerful, costly computers and software;
(e) they don't provide a structured physical workout;
(f) they can't provide an aerobic workout;
(g) they can't manipulate video to keep you in the desired pulse target zone;
(h) they don't provide control through resistive devices that provide a physical workout, and
(i) they don't monitor the users pulse rate to manipulate the video image.

MOTION SIMULATORS IN VR

In the field of modern virtual reality the industry is waiting for a really good, cost effective motion simulator. (VR World magazine January/February '95 pg. 35) In use are gyroscopic motion simulators such as the one seen in the movie Lawn Mower Man. Many other traditional types are under development at universities and businesses. These simulators do have an advantage over industrial simulators in that they are not specifically designed to simulate one vehicle, but are adaptable. However none provide resistive devices to provide an aerobic workout.

All Virtual reality simulators heretofore known, suffer from a number of disadvantages;
(a) they are to expensive for the consumer market.
(b) the gyro types can't simulate vehicle movement.
(c) the automated bases require complicated hydraulics, pneumatics or electric actuators.
(d) the automated bases require complex computer input and control.
(e) they incorporate no methods for manually generated movement that can simulate a vehicle.
(f) there are no methods to simulate motion on a base without automation.
(g) there are no methods to simulate motion on a base with or without automation that provides an aerobic workout.
(h) there are no methods to control the motion simulator by providing resistive control means for a physical workout.

EXERCISE MACHINES

Another growing area for motion simulation is the health and fitness market. New products incorporating a physical workout, motion simulation, and video are raising the entertainment value of boring exercise machines.

Buckley, U.S. Pat. No. 4,630,817 teaches a stationary exercise device in which the user was seated and operated a moveable control rod against resistance in two degrees of motion to control a video game like a joy stick. While providing some exercise to parts of the upper body, it did not provide a suitable workout to the whole body. It also lacked the ability to control the game effectively by its restriction of only two degrees of control. Braeunig, U.S. Pat. No. 4,925,189 teaches a body mounted input device that senses the tilt of a users body and manipulates a video image. Again it is restrained by only two degrees of control and provides no motion simulation. This arrangement could be used for an aerobic workout but not for strength training against resistance.

While providing a more entertaining environment these inventions did not approach reality especially in recreating the forces of motion. Several prior art references disclose inventions which do attempt to overcome this obstacle. In U.S. Pat. No. 5,240,417 Smithson teaches a simulator for riding a bicycle. This invention is an improvement over the prior art in that it simulates the movement of a bicycle however it is limited to only leaning left or right, or vertical movement around a rear pivot point. Another prior art reference found in the January/February '95 issue of VR World magazine pg. 9 teaches a recumbent bicycle exerciser offered by Cybergear of Cambridge Mass. This bicycle incorporates video that is controlled by leaning the bicycle to the left or right. Also included is a fan for simulated wind.

In all of the above inventions the user is not immersed in the video environment, and in the case of Braeunig it would be dangerous if they were because of the standing position in which it is used. Further the control of video in only two degrees of motion is limiting in most modern applications.

All motion simulating exercisers heretofore known suffer from a number of disadvantages:
(a) they do not posses the ability to simulate more than two or three of the components of motion and therefore can not believably replicate the forces of motion;
(b) video representations are small and do not immerse the user in the simulated environment;
(c) the video sequence repeats itself with each use which causes familiarity and boredom;
(d) feedback from the simulated environment like vibrations or a shock wave can not be reproduced;
(e) video and resistance can not be manipulated to keep the user in the desired pulse target zone for a structured workout.

OBJECTS AND ADVANTAGES

A method for reproducing all of the components of motion, providing stimulus for the senses, and doing it cost effectively is what the present manually operated motion simulator accomplishes. It can also naturally provide the missing link between entertainment and a rigorous exercise routine. This allows a user to maintain top physical form while experiencing the adventure his or her life. In addition, the physical fitness routine interactively changes according to the state of the users body at the present moment.

Accordingly several objects and advantages of my invention are,
(a) to provide a means to effectively manipulate a motion simulator manually;
(b) to provide a manual motion simulator that reproduces the following components of motion;
  (1) pitch down with forward and vertical displacement,
  (2) pitch up with rearward and vertical displacement,
  (3) right roll with lateral displacement to the right and yaw to the right,
  (4) left roll with lateral displacement to the left and yaw to the left,
  (5) forward or rearward longitudinal displacement,
  (6) combinations of pitch, roll, yaw, vertical displacement, lateral displacement, and longitudinal displacement;
(c) to provide a motion simulator that stimulates the bodies following senses;
  (1) [visual]-fully immersive three dimensional stereoscopic vision,
  (2) [auditory]-three dimensional, digital, stereo sound corresponding to visual graphics,
  (3) [tactile]-chassis and control jolts and vibrations corresponding to visual graphics and sound,
(d) to provide high performance motion simulation that greatly reduces the incidence of motion sickness, (e) to provide a motion simulator that will work in conjunction with existing home computers, video gaming systems, and software.

(f) to provide a physical workout that interactively changes in difficulty according to the users body condition.

Still further objects and advantages will become apparent from a consideration of the ensuing description and drawings.

DRAWING FIGURES

In the drawings, closely related figures have the same number but different alphabetic suffixes.

FIG. 2b is a side view of FIG. 2a.

FIG. 3b is a top view of FIG. 3a.

REFERENCE NUMERALS IN DRAWINGS

Figure 1A:
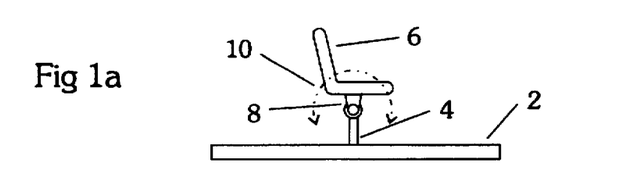
FIG. 1a shows a pivoting seat.

A command
B command
C command
D if statement
E command
F command
G command
H command
I if statement
J if statement
K command
L command
M if statement
N command
O command
P command
Q off
CM center mark
DR distance rearward
N neutral position
DF distance foreword
DL distance left
DRT distance right
P1 member cross point
P2 Y axis pivot point
P3 X axis pivot point
P4 fore and aft control yoke pivot
P5 projected member cross point
2 frame base
4 riser
6 seat
8 universal hinge
10 pitch arc
12 pitch arc
14 lever arc
16 lever
18 lever guide set
20 lever pivot arc
22 linkage arc
24 motion simulator base
26 lever arc
28 universal hinge
30 universal hinge
32 pitch arc
34 motion surface
36 lever
38 universal hinge
40 bracket
42 linkage
44 linkage arc
46 frame
48 motion surface
50 center member
52 left side member
54 right side member
56 yaw arc
58 universal hinge
60 universal hinge
62 roll arc
64 universal hinge
66 roll arc
68 hinge
70 universal hinge
72 universal hinge arc
74 universal hinge
76 universal hinge arc
78 universal hinge arc
80 pitch arc
82 hinge arc
90 frame representation
92 motion surface tongue
94 rear cross member 96 right frame rail
98 left frame rail
100 motion surface
101 control assembly
102 front cross member
103 longitudinal sensing means
104 joystick lever
105 lateral sensing means
106 joystick pivot yoke
108 left control linkage
110 right control linkage
112 fore and aft arc
114 side to side arc
116 universal movement arc
118 steering wheel
120 control lever
122 pivot plate
124 directional control shaft
126 threaded shaft
128 retaining nut
130 pivot plate
132 control yoke assembly
134 right tie rod
136 left tie rod
138 spreader shaft
140 right side member
141 pitch arc
142 left side member
143 roll arc
144 motion surface
147 pitch arc
148 yaw arc
149 roll arc
154 universal hinge
156 right control link
160 right control lever
164 left control link
166 left control link universal hinge
168 left control lever pivot mount
176 universal hinge
178 universal hinge
190 actuator
191 bracket
192 potentiometer
193 lock out brace
194 joystick lever
196 variable resistance universal hinge
198 pivoting seat
200 user
202 head mounted display
204 earphones
206 pulse monitor
208 support belt
210 harness
212 frame
214 frame base
216 pedal assembly
218 electronic actuator control
220 subframe
222 seat
224 roller assembly
226 vibration generator
228 foot pedal
230 pedal linkage
232 pedal pivot
234 pedal arc
236 seat movement range
238 push pull cable Description FIG. 1a—pivoting seat FIG. 1a is a side view of a seat 6 capable of universal movement about a point. A frame base 2 is rigidly fixed to a riser 4. Riser 4 has a universal hinge 8 at its upper end which connects to seat 6. A pitch arc 10 is shown as a visual aid.

Operation FIG. 1a—pivoting seat

In operation FIG. 1a represents the most rudimentary and inexpensive form of manipulating a surface manually. A user sits in seat 6 and applies pressure to frame base 2 with the users feet. This rotates seat 6 about an axis defined by universal hinge 8, universal hinge 8 being supported by riser 4. The resulting movement is represented in one plane by pitch arc 10. This arrangement allows the full range of pivoting movement commonly associated with only complex automated motion simulators. However, while providing motion this arrangement locks the ability to provide the "detachment" necessary for the user to feel he or she is not in contact with the ground. The users brain will have a very hard time convincing itself that it has left the ground when his or her feet have never left it.

Figure 1B:
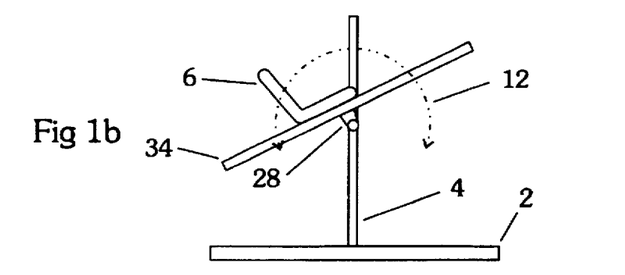
FIG. 1b shows a motion surface pivoting in one axis and a riser on the frame used as a handle.

Description FIG. 1b—pivoting surface with stationary handle

FIG. 1b shows an improvement to FIG. 1a riser 4 is still rigidly connected to frame base 2, and now extends above the seat 6 and has a universal hinge 28 mounted below its upper end. Universal hinge 28 mounts to a motion surface 34 which now accommodates seat 6. A pitch arc 12 represents movement.

Operation FIG. 1b—pivoting surface with stationary handle

The user now sits in seat 6 and can move motion surface 34 around universal hinge 28, represented by pitch arc 12. This is done by applying force to frame base 2 through riser 4 like a flight joy stick. Riser 4 is a part of the frame. This arrangement will provide a high degree of detachment due to the users whole body moving with motion surface 34. However, mentally the user will know the control is remaining in place and only motion surface 34 is moving.

Figure 1C:
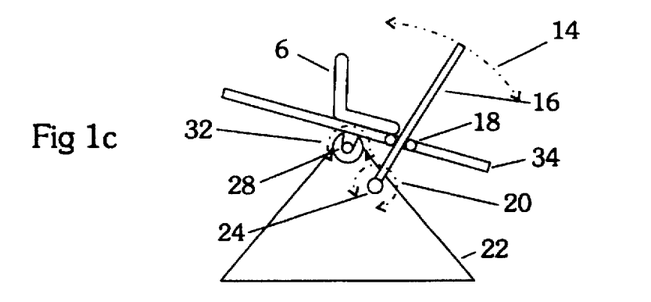
FIG. 1c shows a pivoting motion surface with a lever attached to the frame.

Description FIG. 1c—motion surface with base mounted lever

FIG. 1c shows an improvement to FIG. 1b motion surface 34 now mounts to a motion simulator base 22 which accommodates the mounting of a lever 16 through a universal hinge 24. Lever 16 is slideably joined to motion surface 34 and held in place by a lever guide set 18. A lever arc 14 illustrates one plane of motion. A lever pivot arc 20 illustrates the motion of lever 16. A pitch arc 32 illustrates the motion of universal hinge 28.

Operation FIG. 1c—motion surface with base mounted lever

The user sits in seat 6 and applies force to lever 16 in the direction the user wishes to turn. Pitch arc 32, lever pivot arc 20 and lever arc 14 show the movement when force is applied to lever 16 in a forward direction simulating a downward pitch. Lever 16 rotates about universal hinge 24 applying force to lever guide set 18 which tilts motion surface 34 forward. Motion simulator base 22 allows the mounting of universal hinge 28 and universal hinge 24. This arrangement allows lever 16 to emulate the operation of a real aircraft joystick, where pushing forward results in a downward pitch.

Figure 1D:
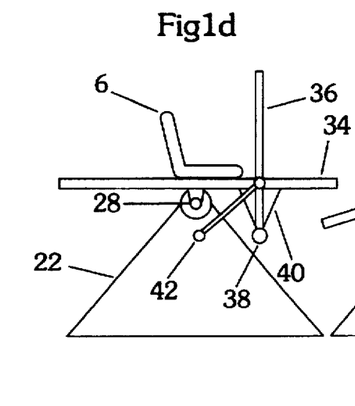
FIG. 1d shows a motion surface with a lever and linkage attached.
Figure 1E:
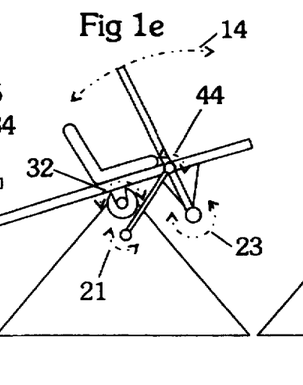
FIG. 1e shows FIG. 1d in a slight upward pitch.
Figure 1F:
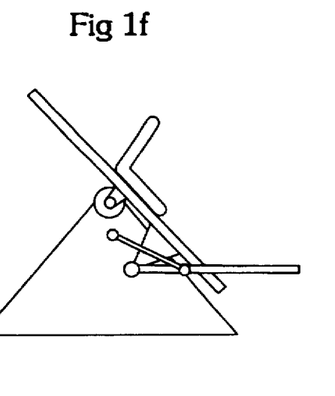
FIG. 1f shows FIG. 1d in a downward pitch position.

Description FIGS. 1d–1f, motion surface with lever and linkage

Motion surface 34 has a bracket 40 mounted under it which mounts a lever 36 through a universal hinge 38. Universally hinged to lever 36 above universal hinge 38 is a linkage 42 which also universally mounts to motion simulator base 22 at its other end. A lever arc 23 shows the movement of universal hinge 38. A linkage arc 21 shows the movement of linkage 42 at one end and a linkage arc 44 at the other.

Operation FIGS. 1d–1f—motion surface with lever and linkage

FIG. 1d shows the assembly in a neutral position.

FIG. 1e shows lever 36 tilted slightly rearward, when this occurred lever 36 had to move about the axis defined by both linkage 42 and universal hinge 38. This produced an upward force on bracket 40 and motion surface 34 which rotated motion surface 34 rearward about universal hinge 28. linkage arc 21, lever arc 23, pitch arc 32, and linkage arc 44 illustrate these movements.

FIG. 1f shows lever 36 in a maximum forward position and it's concurrent effect of a full downward pitch. This arrangement provides a realistic feel in which lever 36 is a part of what the user associates with motion surface 34. This system of using a lever on the motion surface enables the application of mechanical advantage by the placement of linkage 42. This amount of advantage is determined by the ratio of how close linkage 42 is mounted to universal hinge 38 on lever 36, and how close the other end of linkage 42 is mounted to universal hinge 28 of motion surface 34. This new arrangement with a motion surface mounted lever will economically simulate pitch and roll by supplying physical force.

Figure 2A:
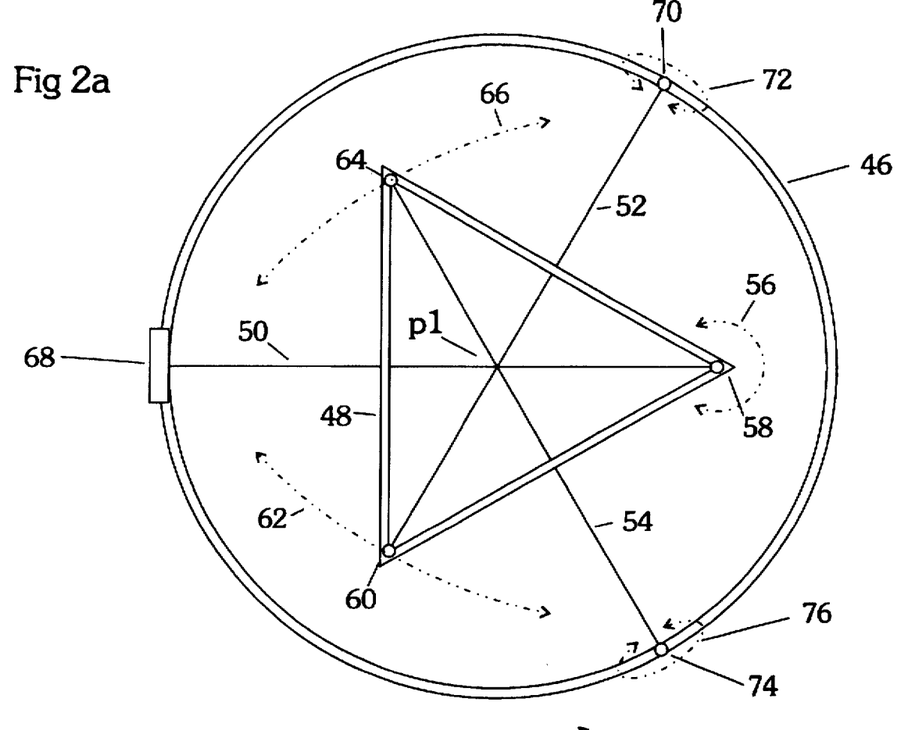
FIG. 2a is a top illustrative view of a tripod type motion simulator.

Description FIG. 2a—tripod type motion simulator

Figure 2B:
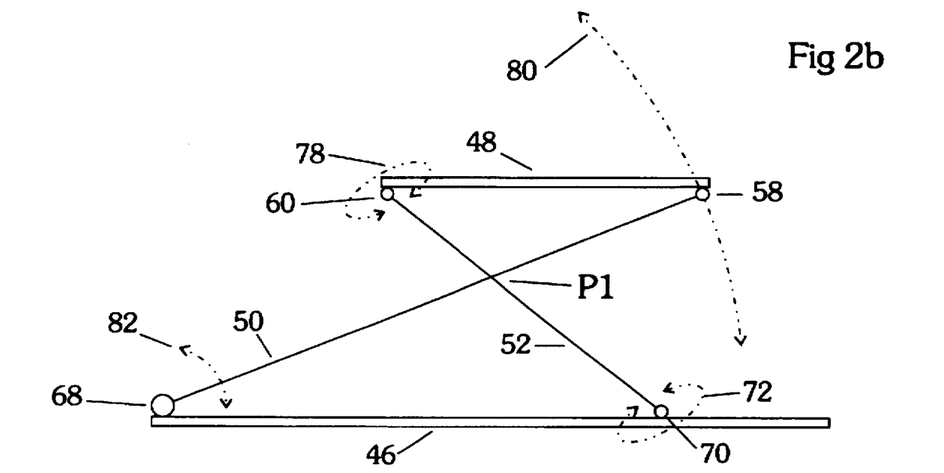

FIG. 2a and 2b show a frame 46 depicted as circular. Frame 46 has three attachment points a hinge 68, a universal hinge 70, and a universal hinge 74. Hinge 68 is attached to a center member 50 at its lower end. At center member 50's upper end there is a universal hinge 58. Universal hinge 70 is attached to a left side member 52 at it's lower end. The upper end of left side member 52 has a universal hinge 60 attached. Likewise universal hinge 74 is attached to a right side member 54 at it's lower end. The upper end of right side member 54 has a universal hinge 64 attached. Universal hinge 64, universal hinge 60, and universal hinge 58 attach at equal distances to a motion surface 48. motion surface 48 is centered above frame 46. left side member 52, right side member 54, and center member 50 are of equal length. Member cross point P1 is in the center of motion surface 48 and frame 46 and is the cross point for center member 50, left side member 52, and right side member 54. A universal hinge arc 72, a universal hinge arc 76, a yaw arc 56, a roll arc 66, and a roll arc 62 illustrate motion.

Operation FIG. 2a and 2b—tripod type motion simulator

FIG. 2a is a top view of the basic structure of the motion simulator. motion surface 48 is suspended above frame 46 by right side member 54, left side member 52, and center member 50. These members are in compression under the load of motion surface 48. It is important to note that center member 50 is hinged at its lower end by hinge 68, so as to restrict it's movements to one vertical plane. 50's upper end is universally hinged by universal hinge 58. Right side member 54 and left side member 52 however, are universally hinged at both ends by universal hinge 74 and universal hinge 64, and universal hinge 70 and universal hinge 60 respectively. This allows them total freedom of movement. When motion surface 48 moves to the right or left, (with center member 50 being positioned longitudinally fore and aft and hinge 68 being at the front) it must pivot on universal hinge 58 which can not move side to side. This is because center member 50 is limited to only vertical movement about hinge 68. This arrangement causes motion surface 48 to pivot right or left at universal hinge 58 (yaw), while allowing the connecting points universal hinge 60 and universal hinge 64 swing to the left or right (roll). These movements are illustrated by yaw arc 56, roll arc 62, and roll arc 66. Universal hinge 64 is permitted to move to any point in a concave plane defined by the radius of right side member 54 universally moving about universal hinge 74, shown by universal hinge arc 76. Universal hinge 60 is also permitted to move in a concave plane defined by the radius of left side member 52 universally moving about universal hinge 70, shown by universal hinge arc 72. Because universal hinge 64 and universal hinge 60 are kept at a fixed distance from each other by motion surface 48, as they move together motion surface 48 rolls side to side while at the same time pivoting and producing yaw in that direction. As left side member 52 drops in its radius right side member 54 must rise in its radius a proportional amount. Thus with this configuration not only is roll achieved but a resultant yaw also. This design also provides the ability to self center. When a mass is placed on motion surface 48 its center of mass is placed directly above p1, in this way when motion surface 48 rolls left or right, or pitches it will want to return to its place of equilibrium in the center. This greatly ads to the safety of the device.

Description FIG. 2b—side view of FIG. 2a

FIG. 2b shows a pitch arc 80, a universal hinge arc 78, and a hinge arc 82 for illustration purposes.

Operation FIG. 2b—side view of FIG. 2a

FIG. 2b is a side view of FIG. 2a showing only the left support member for simplicity. This view shows pitch arc 80 of center member 50 in a fixed vertical plane, pivoting around hinge 68, shown by hinge arc 82. As motion surface 48 rolls left or right as described above, it may also pitch up or down. When center member 50 drops in it's angle, left side member 52 and right side member 54 must rise a proportional amount because of their fixed mounting distances on motion surface 48. Universal hinge arc 78 shows the pivoting movements of universal hinge 60 in this situation.

This basic design then reproduces pitch, roll, and yaw, as well as vertical, lateral and longitudinal displacement. (Which will be discussed with FIGS. 4a–4h.) Because the supported mass is kept at or near it's center of gravity moving from a hard right climb to a hard left dive requires little force. However the performance obtained from that little force rivals the performance of the most complex automated motion simulators.

Figure 2C:
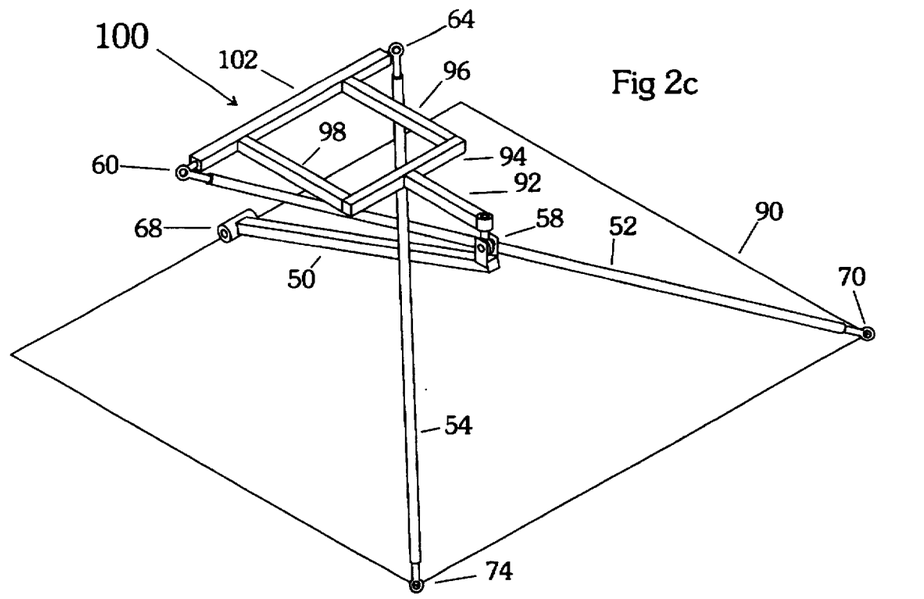
FIG. 2c is a three dimensional view of a tripod type motion simulator.
Figure 2D:
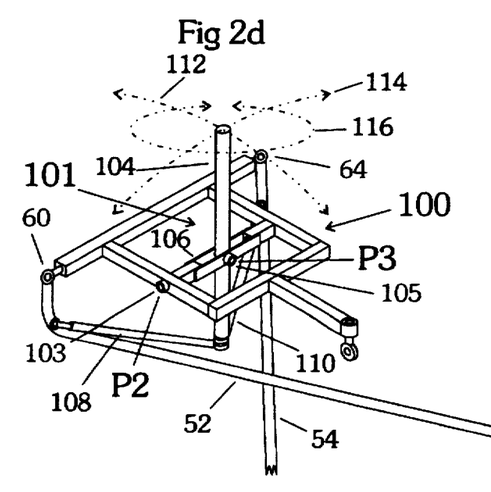
FIG. 2d is a three dimensional view of the joystick type control mechanism.

Description FIG. 2c–2d, motion simulator with controls

FIG. 2c shows a perspective view of the motion simulator in FIGS. 2a and 2b. motion surface 48 being replaced by a motion surface 100 made up of a front cross member 102, a right frame rail 96, a left frame rail 98, a rear cross member 94 and a motion surface tongue 92. A frame representation 90 is shown for illustration purposes.

FIG. 2d shows motion surface 100 with a control assembly 101 pivotally mounted inside at a Y axis pivot point P2. A joystick pivot yoke 106 having a joystick lever 104 is pivotally mounted inside at a X axis pivot point P3. Joystick lever 104 has a left control linkage 108 and a right control linkage 110 universally attached at it's lower end. Left side member 52 is bent upward at it's upper end and is universally connected to universal hinge 60. left control linkage 108 is universally attached at the bend in left side member 52. Likewise right side member 54 is bent upward at it's upper end and is universally connected to universal hinge 64. Right control linkage 110 is universally attached to the bend in right side member 54. A longitudinal sensing means 103 is affixed at Y axis pivot point P2, and a lateral sensing means 105 is affixed at X axis pivot point P3. A fore and aft arc 112, a side to side arc 114, and a universal movement arc 116 illustrate the universal movements of joystick lever 104.

Operation FIG. 2c–2d, motion simulator with controls

FIG. 2c differs from FIGS. 2a and 2b only in that motion surface 48 has been replaced by motion surface 100. Motion surface 100 is made up of front cross member 102, left frame rail 98, right frame rail 96, rear cross member 94, and motion surface tongue 92 to provide space for a centrally mounted control. Frame representation 90 shows the position of the assembly.

FIG. 2d shows control assembly 101 pivotally mounted in motion surface 100 at Y axis pivot point P2. When a user grasps the top of joystick lever 104 and applies a forward force, joystick lever 104 pivots forward around Y axis pivot point P2. At the same time left control linkage 108 and right control linkage 110 are forced rearward by the lower end of joystick lever 104. This forces left side member 52 and right side member 54 to pivot rearward around universal hinge 60 and universal hinge 64, causing motion surface 100 to pitch forward in a dive. When joystick lever 104 is forced to the right it pushes left control linkage 108 which pushes left side member 52 and lifts the left side of motion surface 100. At the same time joystick lever 104 pulled on right control linkage 100, and right control linkage 110, pulled on right side member 54 which drops the right side of motion surface 100. When this occurs motion surface 100 pivots right around universal hinge 58 as described in the operation of FIG. 2a. When control assembly 101 pivots foreword around Y axis pivot point P2, longitudinal sensing means 103 relays this information to the computer using the same signal as a common joystick controller. Likewise when joystick lever 104 pivots left or right around X axis pivot point P3, lateral sensing means 14, relays this information to the computer. In this way the same non-immersive game being played with a joystick, can become an immersive game without any additional software or computer modifications.

Figure 2E:
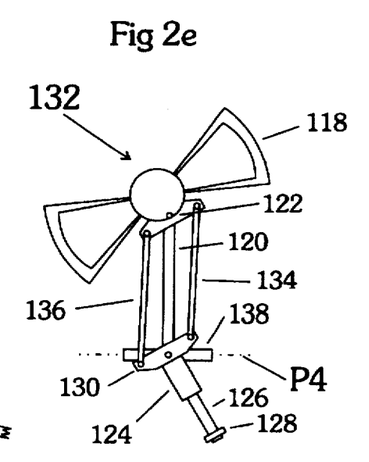
FIG. 2e is a front view of an optional yoke type control mechanism.

Description FIG. 2e—control yoke assembly

FIG. 2e shows a control yoke assembly 132 which has a steering wheel 118 pivotally connected to a control lever 120 by a pivot plate 122. control lever 120 has a spreader shaft 138 joined to its lower end. A right tie rod 134 and a left tie rod 136 are pivotally connected to pivot plate 122, each being mounted on opposite sides an equal distance from pivot plate 122's pivot. Right tie rod 134 and left tie rod 136 are then pivotally mounted at their lower ends to a pivot plate 130 in the same manner. Pivot plate 130 has a directional control shaft 124 extending below it with a threaded shaft 126 and a retaining nut 128 screwed onto it.

Operation FIG. 2e—control yoke assembly

FIG. 2e shows a control yoke assembly 132 which replaces control assembly 101 in FIG. 2d to provide a steering wheel type of control. It differs only in the way it controls right and left turns. Instead of leaning a joystick left or right as in FIG. 2d, steering wheel 118 is rotated left or right. This causes pivot plate 122 to rotate which causes pivot plate 130 to rotate due to the forces of right tie rod 134 and left tie rod 136. directional control shaft 124 and threaded shaft 126 will rotate with pivot plate 130. control yoke assembly 132 mounts into motion surface 100 by pivotally connecting spreader shaft 138 at fore and control yoke pivot P4 to Y axis pivot point P2 in FIG. 2d. Right control linkage 110 and left control linkage 108, (FIG. 2d) are universally mounted to threaded shaft 126 and function the same as in FIG. 2d. Fore and aft control is accomplished by pushing or pulling control yoke assembly 132 around fore and aft control yoke pivot P4.

Figure 3A:
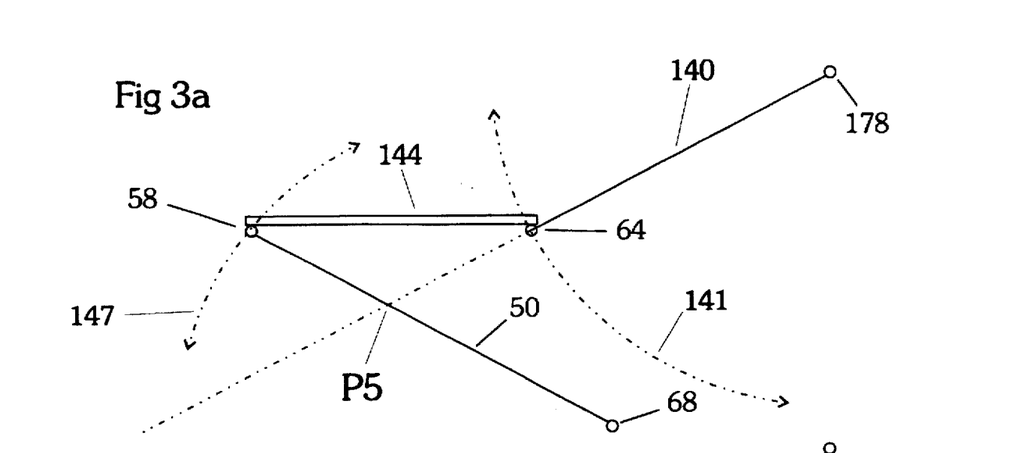
FIG. 3a shows a method for a motion simulator where the side members are in tension.
Figure 3B:
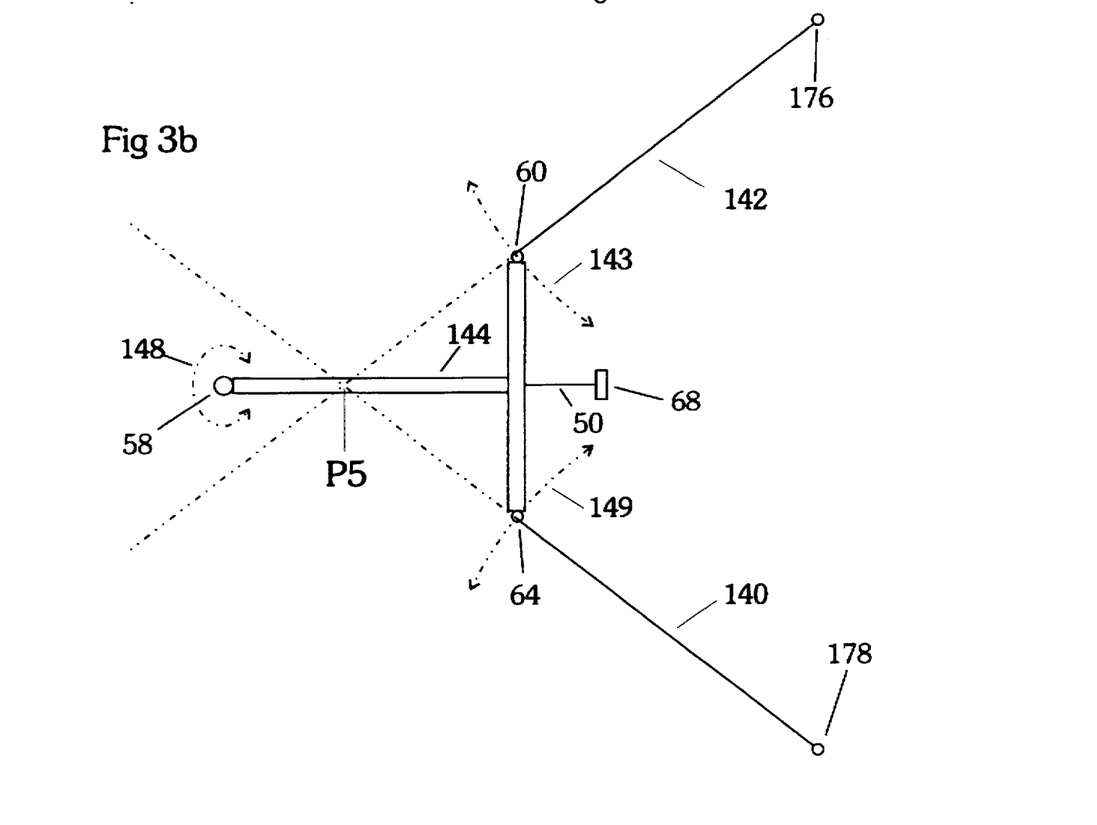

Description FIGS. 3a–3b, tensioned side members

FIGS. 3a and 3b are an illustration of a modification to the simulator in FIG. 2c. A motion surface 144 forms a rigid tee shape. Universally connected to the rear of motion surface 144 is universal hinge 58 which connects to center member 50 and is hinged at its lower end by hinge 68. A right side member 140 is connected to the right end of motion surface 144 through universal hinge 64. Similarly A left side member 142 has at its lower end universal hinge 60, and at its upper end a universal hinge 176. Right side member 140 is connected to the left end of motion surface 144 through universal hinge 60. A pitch arc 141, a pitch arc 147, a roll arc 143, a yaw arc 148, a roll arc 149, and a projected cross point P5 are shown for illustrative purposes.

Operation FIGS. 3a–3b, tensioned side members

Comparing the simulator in FIGS. 3a and 3b to the structure of the simulator in FIG. 2c we see that they are similar except that right side member 140 and left side member 142 now project upward as compared to left side member 52 and right side member 54. The dashed lines in both figures represent the positions where left side member 52 and right side member 54 would be and illustrate that right side member 140 and left side member 142 are simply extensions of left side member 52 and right side member 54. In this way the geometry remains the same and the simulator operates by the same principles. If the same lengths and angles are maintained as illustrated in FIG. 2a, a mass can still be placed at the projected cross point and motion surface 144 will remain in equilibrium. This is so, because when motion surface 144 experiences a downward force it pushes down on center member 50 and pulls down on right side member 140 and left side member 142. When the center of mass is at projected cross point the force trying to push center member 50 down along pitch arc 147 will equal the sum of forces trying to push left side member 142 and right side member 140 down along their paths represented by pitch arc 141. This will establish a state of equilibrium. motion surface 144 rolls laterally by moving left side member 142 around universal hinge 176, and right side member 140 around universal hinge 178, shown by roll arc 143 and roll arc 149. Motion surface 144 will concurrently yaw around universal hinge 58 shown by yaw arc 148. The difference in the movement of motion surface 144 between the two designs is the concave path described in FIGS. 2a and 2b now becomes convex in relation to motion surface 144 in FIGS. 3a and 3b, producing different motion characteristics.

Figure 3C:
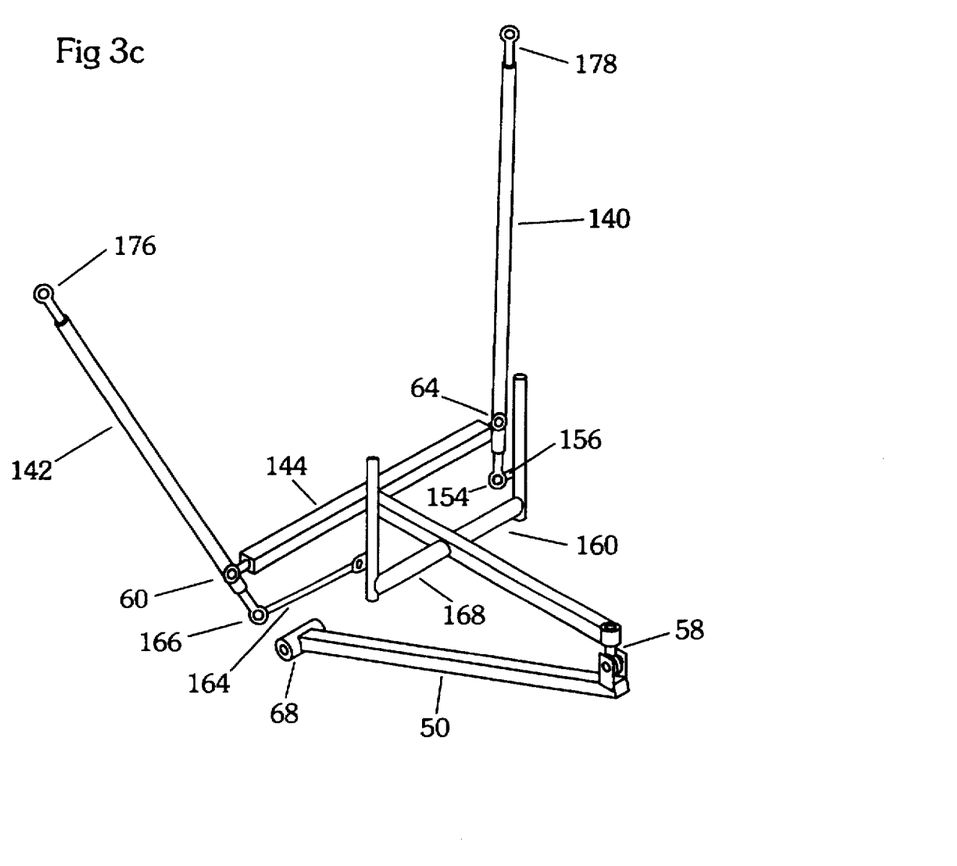
FIG. 3c is a three dimensional view of the simulator in FIG. 3a with lever controls.

Description FIG. 3c—right and left controls

FIG. 3c shows the basic structure of the motion simulator in FIG. 3a and 3b, with left side member 142 universally hinged to the left side of motion surface 144 at a point above a left control link universal hinge 166. Likewise right side member 140 is universally hinged to the right side of motion surface 144 at a point above a universal hinge 154. Motion surface 144 has on it's left side a left control lever 168 pivotally mounted to it so as to permit left control lever 168 to pivot fore and aft. Left control lever 168 has a left control link 164 universally hinged to it. Left control link 164 is universally hinged at it's other end to left side member 142 through left control link universal hinge 166. Motion surface 144 has on it's right side a right control lever 160 pivotally mounted to it so as to permit right control lever 160 to pivot fore and aft. Right control lever 160 has a right control link 156 universally hinged to it. Right control link 156 is universally hinged at it's other end to right side member 140 through universal hinge 154.

Operation FIG. 3c—right and left controls

FIG. 3c shows motion surface 144 being supported by center member 50 which carries the load in compression. Motion surface 144 is also supported by left side member 142 and right side member 140 which carry the load in tension. When a user is positioned on motion surface 144 the user controls the simulation by manipulating right control lever 160 and left control lever 168 in a fore and aft motion. The user is positioned between right control lever 160 and left control lever 168 facing away from universal hinge 58. The user's right hand grasps the top of right control lever 160 and the user's left hand grasps the top of left control lever 168. If the user wants to pitch down into a dive, the user evenly pushes both right control lever 160 and left control lever 168 forward. As right control lever 160 rotates forward it pushes on right control link 156 which pushes on right side member 140 at universal hinge 154. This causes right side member 140 to rotate around universal hinge 64. The same occurs on the other side, left control lever 168 pushes left control link 164 which pushes left control link universal hinge 166, moving left side member 142 around universal hinge 60. As this happens right side member 140 and left side member 142 drop evenly down and forward in their arcs. Motion surface 144 tilts and moves forward. Center member 50 follows by rising in it's arc, lifting the rear of motion surface 144. When the user is in the dive, if the user wants to turn left the user pushes right control lever 160 forward the same amount as the user pulls left control lever 168. This causes right side member 140 to drop and move to the left. It also causes left side member 142 to rise in it it's arc and move left. Motion surface 144 concurrently follows by rolling to the left while pivoting left around universal hinge 58. In this manner the user can go from a full left turn dive to a full right climb by pulling both right side member 140 and left side member 142, but pulling right side member 140 faster. Thus the user experiences a smooth right roll as the user feels himself turning to the right (yaw). Because the user sits a distance in front of universal hinge 58 the user will also feel a lateral displacement to the right, and all this will seamlessly happen as the user pitches from downward to upward while being displaced rearward and upward.

Discussion FIGS. 4a–4d, longitudinal displacement diagrams

Figure 4A:
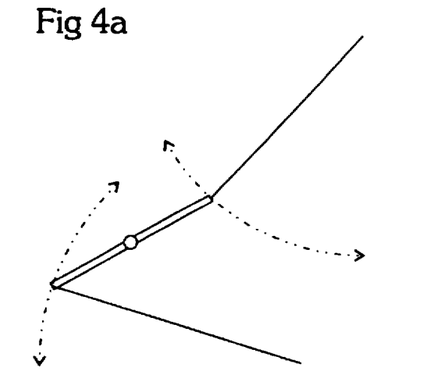
FIG. 4a illustrates the rearward longitudinal displacement in a upward pitch.
Figure 4B:
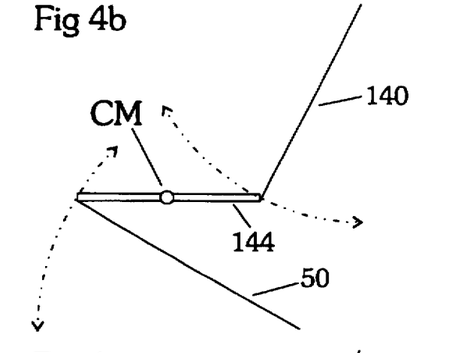
FIG. 4b illustrates a neutral position.

FIG. 4b shows a side diagram of the motion simulator in FIG. 3c with a center mark CM denoting a fixed point on motion surface 144 for illustration purposes. FIG. 4d shows a DR, a neutral position N and a distance foreword DF.

Operation FIGS. 4a–4d, longitudinal displacement diagrams

Figure 4C:
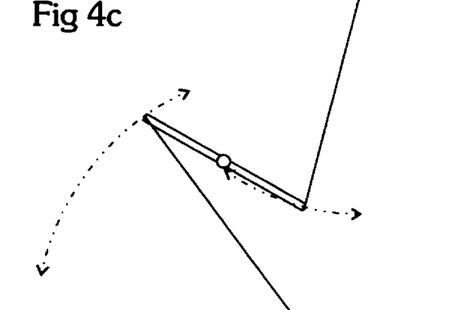
FIG. 4c illustrates the forward longitudinal displacement in a downward pitch.
Figure 4D:
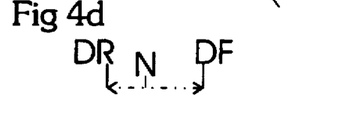
FIG. 4d shows the total longitudinal displacement.

FIGS. 4a–4d show a diagram side view of the motion simulator in FIG. 3c to illustrate fore and aft displacement through the range of pitch. FIG. 4a shows an upward pitch. FIG. 4b shows no pitch. FIG. 4c shows a downward pitch. FIG. 4d shows the total distance traveled by center mark CM from distance rearward DR associated with FIG. 4a, to neutral position N associated with the position of center mark CM in FIG. 4b to distance foreword DF, associated with the distance traveled by center mark CM in FIG. 3c. The distance between distance rearward DR and distance foreword DF being the total longitudinal displacement through the range of pitch for that configuration. Vertical displacement depends on how far in front of CM the user sits.

Description FIGS. 4e–4h, lateral displacement diagram.

Figure 4E:
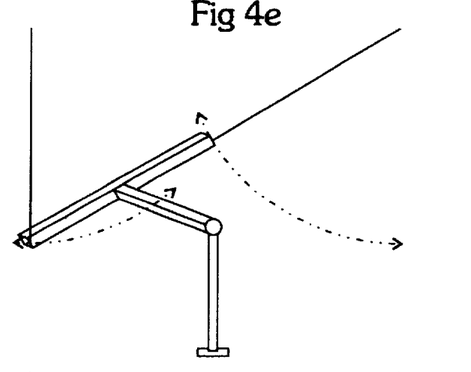
FIG. 4e illustrates the lateral displacement to the left in a left roll, and yaw to the left.
Figure 4F:
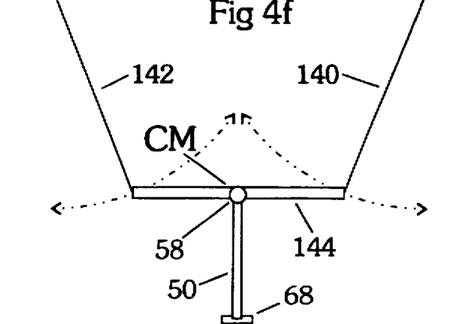
FIG. 4f illustrates a neutral position.

FIG. 4f shows a diagram of the front view of the motion simulator in FIG. 3c. Center mark CM denotes the center of motion surface 144 for illustration purposes. FIG. 4h shows a DL, a neutral position N, and a DRT.

Operation FIGS. 4e–4h, lateral displacement diagram

Figure 4G:
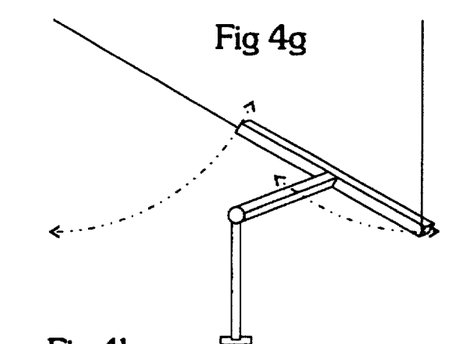
FIG. 4g illustrates the lateral displacement to the right in a right roll and yaw to the right.
Figure 4H:
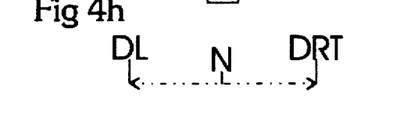
FIG. 4h shows the total displacement right and left.

FIGS. 4e–4h show a diagram of the front view of the motion simulator in FIG. 3c to illustrate side to side displacement. Also illustrated is the range of roll with the accompanying yaw. FIG. 4e shows a roll left with yaw to the left. FIG. 4f shows no roll. FIG. 4g shows a roll right with yaw to the right. FIG. 4h shows neutral position N in the center of the diagram, neutral position N designating the position of center mark CM in FIG. 4f. Distance left DL shows the distance traveled by center mark CM from the neutral position in FIG. 4f to the left roll position in FIG. 4e. Distance right DRT shows the distance traveled by center mark CM from FIG. 4f to the right roll position in FIG. 4g. The distance between distance left DL, and distance right DRT, represents the total lateral displacement experienced by the user for this configuration.

Figures 5A, 5B:
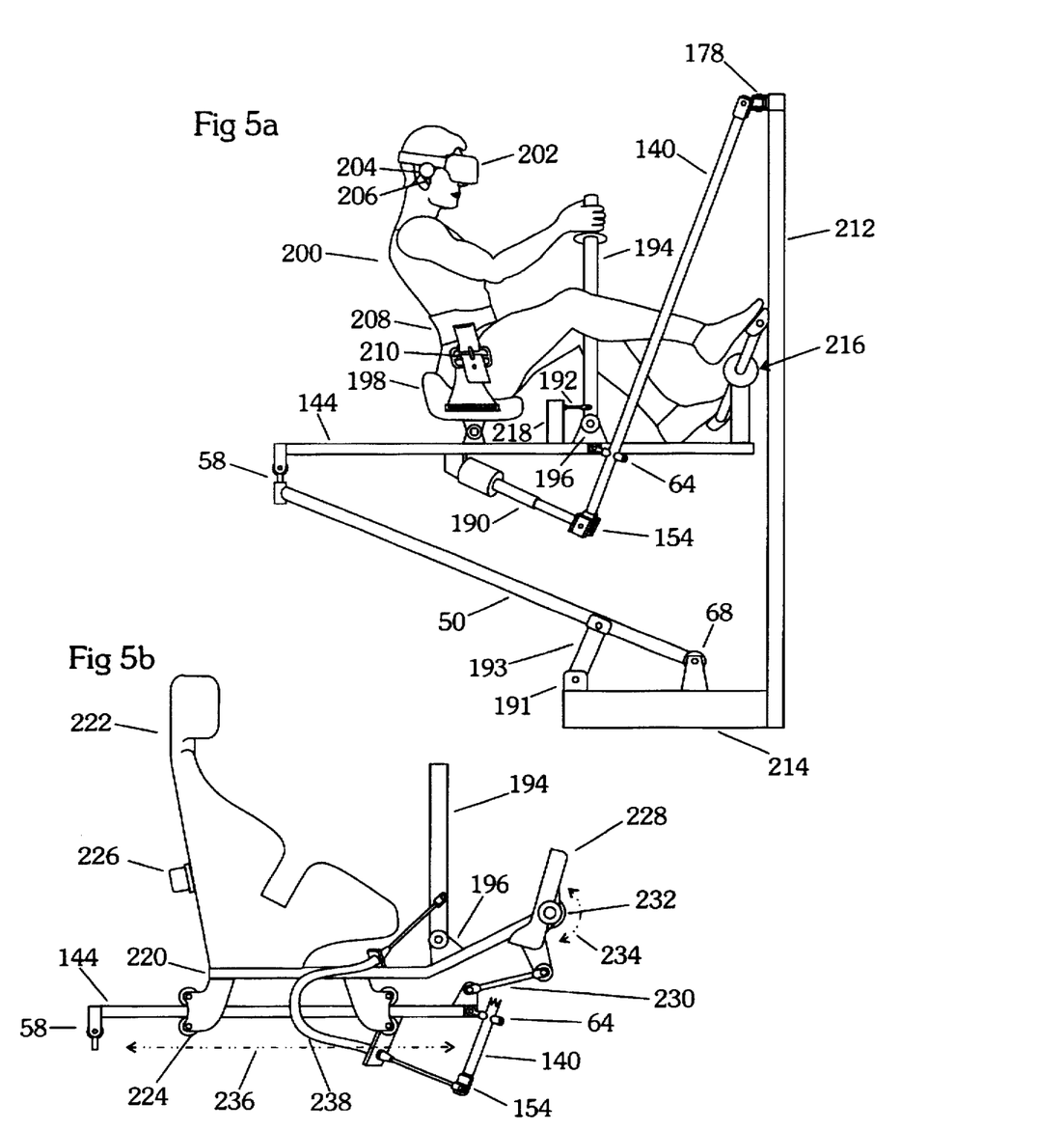
FIG. 5a is a side view of FIG. 3c with the user in place and a method for automation as well as other features.
FIG. 5b shows the motion surface with linear acceleration means and flexible linkage means.

Description FIG. 5a—adaptations to FIG. 3c

FIG. 5a shows a side view of the motion simulator in FIG. 3c. In this ramification a control linkage is replaced by a actuator 190. A joystick lever 194 is universally mounted to motion surface 144 by a variable resistance universal hinge 196. Joystick lever 194 has a potentiometer 192 hooked into a electronic actuator control 218. A user 200 wears a head mounted display 202 equipped with a earphones 204 and a pulse monitor 206. User 200 sits in a pivoting seat 198 pivotally mounted to motion surface 144. User 200 is secured to pivoting seat 198 by using a support belt 208 with a harness 210. User 200 also uses a pedal assembly 216. A frame 212 with a frame base 214 is also depicted to tie the elements together. Mounted to frame base 214 is a bracket 191 which pivotally mounts a lockout arm 193.

Operation FIG. 5a—adaptations to FIG. 3c

FIG. 5a shows a side view of the motion simulator in FIG. 3c with frame 212 and frame base 214 representing how it might be mounted. This depicts how the entertainment factors of the simulator naturally make it the best platform for a fitness machine. User 200 wears head mounted display 202 with earphones 204 to provide immersion in the simulation experience. User 200 sits in pivoting seat 198 which can rotate with the user as the user leans fore and aft as the user controls joystick lever 194 around variable resistance universal hinge 196. Variable resistance universal hinge 196 provides optional added resistance for strength training. For safety the user is restrained by harness 210 and support belt 208 planting the user firmly into the seat no matter which position the user is in. Pedal assembly 216 aids in providing a steady aerobic workout and also provides a speed reference for the video simulation. User 200 wears pulse monitor 206 to provide information about the users body condition as is described for FIG. 6. In this manner the users whole body becomes part of the simulation, while using the existing computer and software.

The control linkage has been replaced by actuator 190 which allows the simulator to be automated in an inexpensive way. Only the right side is shown, the left side would reveal a similar arrangement. Actuator 190 receives a voltage that is varied through some circuitry represented here by potentiometer 192 for position sensing and electronic actuator control 218 for converting that information into usable voltage.

When used as an exerciser, joystick lever 194, potentiometer 192, variable resistance universal hinge 196, electronic actuator control 218, and actuator 190, would replaced by a manual control means such as the one shown in FIG. 3c. This combined with pivoting seat 198 and pedal assembly 216 would provide a total body workout unrivaled by any other exercise machine. The effectiveness is due to severals factors:

1. user 200 must operate left control lever 168 and right control lever 160 indpendently against varying resistance,
2. this operation is executed at any position in the range of the simulation, presenting situations were user 200 is in a full upward pitch, (leaning backwards), and must push on right control lever 160 and left control lever 168 in unison or by varying force between them without the aid of a seat back to push against. This scenario would require the use of stomach muscles to counteract gravity and the pressing motion of the chest and arms. This is further complicated by the twisting motion required by the torso if left control lever 168 requires a different amount of movement than right control lever 160,
3. all this occurs while thrusting each leg alternately against each respective pedal of pedal assembly 216, with little to push against in pivoting seat 198,
4. left control lever 168 and right control lever 160 need not pivot parallel with each other but can be canted so in the foremost position they come close together, and in the rearmost position they are far apart. This works all of the chest evenly, and requires the torso to twist in a hard turn when right control lever 160 is foreword and left control lever 168 is rearward, 5 because both gravity in any direction and resistance must be overcome, the whole body is effectively exercised.

Because of the unique construction of the simulator, six degrees of freedom can be accomplished with only two actuators. Any other automated motion simulator that can simulate motion with six degrees of freedom would have at the minimum three actuators. Most simulators however add more with one actuator dedicated to each of the six degrees. The manual motion simulator includes the degrees together, such as pitch, longitudinal displacement, and vertical displacement, and roll incorporates lateral displacement and yaw. While not allowing a lateral displacement with no other movement like the complex simulators, the components are logically grouped to simulate the dynamics of a vehicle moving through three dimensions seamlessly and smoothly without the need for complex and costly computer controls. Another advantage is the ability to lock the pitch motion out, with it's accompanying longitudinal and vertical displacements. This is accomplished by simply rotating lockout arm 193 around bracket 191 and locking it in to center member 50 with a pin. This now simulates a flat turning vehicle moving in two dimension like a car. The remaining components of motion, roll, yaw, and lateral displacement work together in simulating a turn on a flat surface while in motion. The only change that must be made is that user 200 is turned the other direction. If joystick lever 194, potentiometer 192, electronic actuator control 218, and actuator 190 were replaced by control yoke assembly 132 in FIG. 2e, steering wheel 118 would not move fore and aft due to eliminating any motion in center member 50. Therefore steering wheel 118 would only rotate left and right like an automotive steering wheel. When user 200 turns to the left, motion surface 144 will yaw to the left. User 200 will also move and lean to the right, allowing gravity continue pulling on the right side of the user because of the user leaned over position. This creates the illusion of centripetal force pulling on the users body as the user makes the turn. The video image does not lean but remains level in relation to the users body position.

Description FIG. 5b—longitudinal accelerator and linkage

FIG. 5b shows a side view of motion surface 144 with a seat 222 slideably mounted to it. Seat 222 mounts to a subframe 220. subframe 220 has mounted under it a roller assembly 224 at the front and rear. Roller assembly 224 rolls along motion surface 144. Subframe 220 has a foot pedal 228 pivotally mounted to subframe 220 through a pedal pivot 232. Foot pedal 228 is coupled to motion surface 144 through a pedal linkage 230. A push pull cable 238 is connected to joystick lever 194 at one end and universal hinge 154 at the other end. Subframe 220 has a vibration generator 226 affixed to it's back. Joystick lever 194 is universally hinged to subframe 220 by variable resistance universal hinge 196. A pedal arc 234, and a seat movement range 236 illustrate motion.

Operation FIG. 5b—longitudinal accelerator and linkage

Motion surface 144 is equipped to accommodate a set of roller assembly 224 to traverse it's length longitudinally. This will provide simulated acceleration and deceleration no matter what attitude the simulator is in. This is accomplished by the user rotating foot pedals like an accelerator.

Subframe 220 is equipped with joystick lever 194 attached through variable resistance universal hinge 196. To allow for the movement of subframe 220 along motion surface 144 the normal rigid control is replaced with push pull cable 238. Push pull cable 238 is mounted on subframe 220 to variable resistance universal hinge 196 and under motion surface 144 to universal hinge 154 at the same angles as the other forms of linkages were. This maintains the desired geometry while offering a flexible linkage.

When foot pedal 228 is rotated forward pedal linkage 230 pushes on motion surface 144 moving subframe 220 and every thing mounted to it in a longitudinal fashion shown by seat movement range 236. Seat 222 pushes on the back of the user simulating acceleration. Foot pedal 228 rotates around pedal pivot 232, shown by pedal arc 234. The point where pedal linkage 230 mounts to foot pedal 228 also rotates around pedal pivot 232. In the neutral position shown, the point where 172 mounts to foot pedal 228 is directly under pedal pivot 232. As foot pedal 228 is rotated forward the amount of forward movement of subframe 220 is not proportional, but will decline to a gradual seamless stop as foot pedal 228 rotates forward. This is because the pint where 228 and 230 connect travels at first horizontally and is changed gradually to vertical movement as it moves through it's arc around pedal pivot 232. This is important when graphically depicting an acceleration. At first the scenery starts to visually speed past the user, at the same time the user feels a push against the users back and forward movement. The slow down of forward movement is so smooth that all the user will notice is the increasing speed of the visuals and sound. When the user wants to slow down the user rotates foot pedal 228 backward to neutral, at this point foot pedal 228 is restricted from further rearward movement and stops abruptly. To the user these events are coordinated as follows. When rotating foot pedal 228 rearward at first the motion is subtle but visually and aurally the user knows the he or she has started to slow. As foot pedal 228 approaches it's neutral position subframe 220 moves rearward faster, seat 222 no longer pushing on the users back, but now pulling the user backward. The user feels as though the seat restraint is restraining the user from his or her forward momentum. This movement rearward is coordinated with the video and sound so that when foot pedal 228 stops at it's neutral position abruptly, the video and sound verify this fact. Seat 222 is also equipped with vibration generator 226, which responds to the low range of an audio signal, which envelopes the user in realistic sound and effects.

This form of movement reduction is used on all the forms of control for this simulator, which greatly adds to the realism of the simulation.

Figure 6:
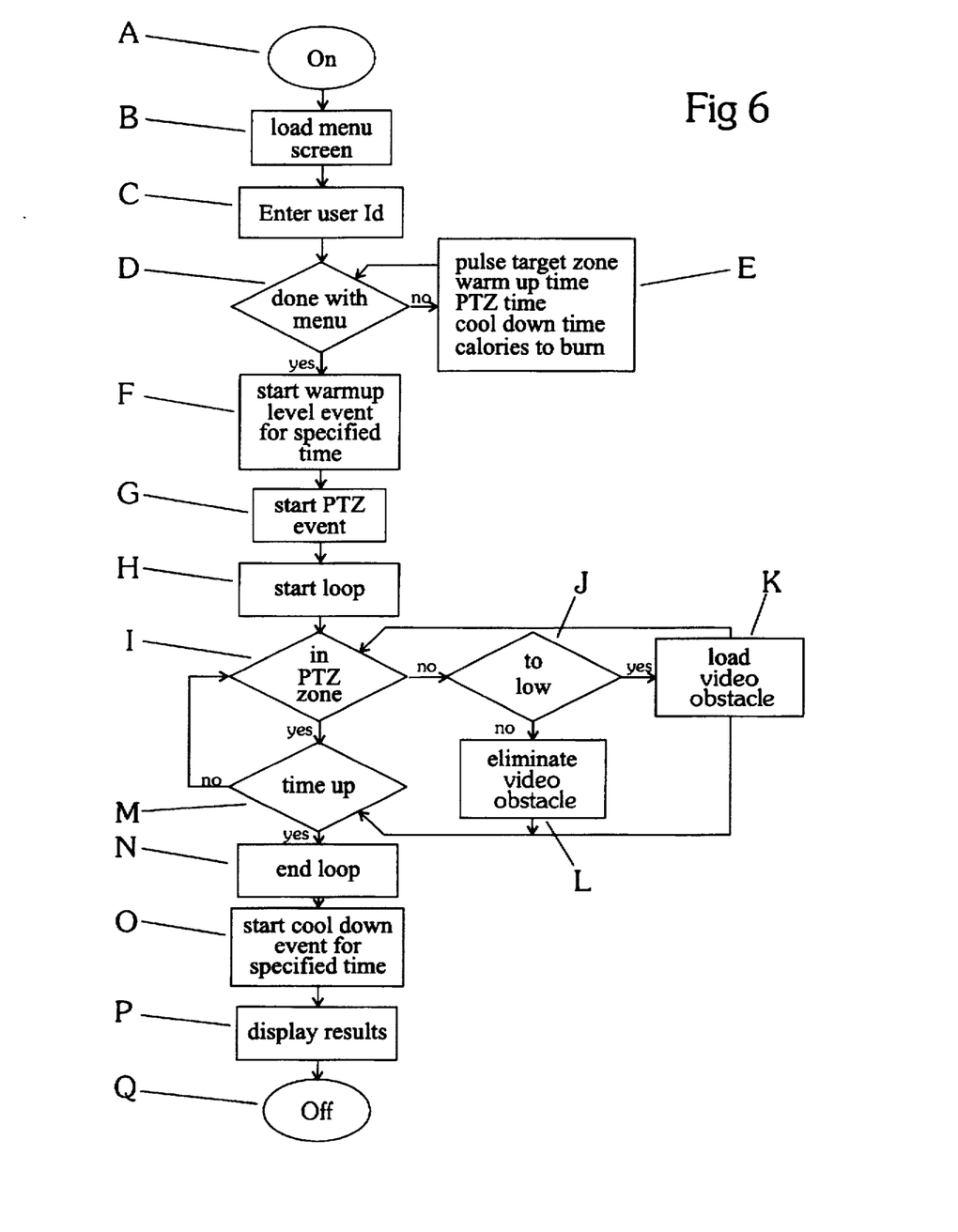
FIG. 6 is a flow diagram of the graphic control software for use when used as an exerciser.

Description FIG. 6—interactive software flow diagram

A command A is followed by a command B. Command B is followed by a command C, and command C is followed by an if statement D. The flow then may go on to a command F or it may go to a command E. If command E is executed after if statement D, then the flow returns to if statement D. Once the flow reaches command F, it moves on through a command G, a command H, and an if statement I. At if statement I it may go to a if statement M, or it can go to a if statement J. If it goes to if statement J it may go to a command K or a command L. From command K it can go to if statement M or go back to if statement I. From command L it goes back to if statement M. From if statement M it can go back to if statement I or it can progress to a command N. After command N it goes through a command O, a command P, and finally a command Q.

Operation FIG. 6—interactive software flow diagram

FIG. 6 shows a flow chart of a software program that interactively changes the video image according to the users body condition. This could be used in conjunction with the exerciser in FIG. 5a, therefore we will refer to some of the elements in FIG. 5a. It is a common practice with other exercise machines to alter their difficulty according to a video image to simulate reality. The software in FIG. 6 provides a way to alter the video image according to the users body condition, allowing the image to require a faster pedaling motion, or a specified movement, such as a diving right turn, in a shorter amount of time. Command A, is executed at the beginning to start a simulation. Command B loads a menu screen which asks the user for his Id. number. Command C accesses the file for that user Id. number and personalizes the simulation. If statement D then queries as to whether any additional information needs to be changed or entered.

If if statement D is no then command E allows the user to customize the simulation by specifying:

what pulse target zone the user wants to be kept in, how much time the user wants to take to reach the user pulse target zone (PTZ time), how long the user wants to be in the users pulse target zone, or how many calories the user wants to burn can be entered instead of a PTZ time, and how long the user wants to take after the PTZ time to cool down before the end of the simulation.

After this information is entered, if statement D then goes on to command F. At this point the simulation begins with a visual scenario of obstacles that do not require a lot of effort. This continues until the specified time runs out. Command G starts adding video events that require greater pedaling speed or more movements of the simulator. This heightened level of physical activity will increase the pulse rate of the user. The pulse is being monitored by the program through the use of an ear mounted pulse monitor 206. At this point command H is invoked and the program monitors the bodies pulse rate to determine if it needs to add video obstacles or not. This is accomplished by the loop represented by if statement I, if statement J, command K, and command L. If if statement I senses that the users pulse is not in the target zone, then if statement J asks whether it is higher or lower than the users defined range permits. If it is to low, command K loads an other video obstacle in the simulation to promote more physical activity. If it is to high, command L will eliminate or reduce the difficulty of a video obstacle. If statement M then asks if the PTZ time has lapsed. If it hasn't the loop starts back at if statement I. If it has, command N ends the loop and command O starts the cool down video sequence. This is a video scene that does not require much physical activity. After the cool down time is over command P displays the results and statistics of the workout session. command Q then ends the program.

Conclusion, Ramifications, and Scope

It is first important to restate that this motion simulator does not pivot around a fixed point, but moves the motion surface around a predefined plane. If you were to plot a point at a right angle to motion surface a fixed distance away, and move the surface through a roll from left to right or a dive fore and aft or both. The point would move around a lot. This is due to the fact that the simulator is not bound to only three degrees of movement, but flows through six degrees of movement. The plane the surface follows is determined by the length and configuration of the three motion members. The three member design is responsible for several advantages and can be broken down to two parts. First consider the two side members. These members are the same length and are mounted symmetrically to an object at one end and the motion surface at the other, crossing or angled toward one another depending on the configuration desired. This has an advantage over a pivot design in that when you turn to the right it moves to the right as it tilts. This creates the sensation of movement throughout the body by pushing up on the legs and buttocks.

The angle of the side members determine the amount of lateral displacement as well as roll. Combined with the center member they also determine longitudinal displacement and pitch. If these members were mounted vertically at right angles to the motion surface in compression, the surface would produce displacement longitudinally and laterally. But no roll or pitch would be possible. By placing them at an angle in relation to the motion surface, in the longitudinal plane different characteristics of pitch are accomplished. By placing the side members at an angle in relation to the motion surface in the lateral plane, different characteristics of roll are accomplished. These characteristics are determined by the angels of the members.

The center member, has two other functions. First is a pivotal attachment to the motion surface, providing yaw to the simulator. The second is that the member is hinged to restrict movement to a vertical path at it's lower end, preventing the upper end from moving left or right. So when the surface is turned left, it will move to the left while pivoting around the universal hinge of the center member.

This center member may be eliminated and only its pivotal attachment to the frame retained. In this manner it becomes a flat turning vehicle simulator, simulating yaw, and centripetal force.

The motion surface is controlled through many variations of a motion surface mounted lever. These act upon the members to make them move simultaneously about their respective mounting points. Many variations of linkages may be used to couple the lever to the members.

While emphasis has been placed on the aspects of motion simulation, the simulator also provides simulation for the senses. The use of a head mounted display immerses the user in a three dimensional visual world. This display also incorporates head tracking so the video image scrolls in relation to the users head position. This provides a high degree of realism to the simulation, giving the user the opportunity to look over his or her shoulder and see what is there. Stereo headphones provide stereo sound, and with the use of specialized sound software, sounds can emanate from the visual object in three dimensional cyberspace. Often overlooked is the tactile sensation. This is important because our interaction with our environment comes through by touch. This simulator uses two methods to accomplish this. First is a chassis mounted vibration generator, which simulates engine vibrations, jolts from explosions, and any other auditory effect that is heard through the headphones. The second is the use of subwoofers surrounding the simulator that stimulate the hairs on the skin in conjunction with the vibrations and specialized sound.

There is a distinct advantage in overcoming motion sickness when using manual manipulation. Motion sickness occurs when the bodies motion sensing abilities send motion information to the brain that does not match what the eyes are reporting. Because the control is mechanically linked to the motion of the simulator, there is never any lag or discrepancy between the movement of the control and the movement of the user. By the user manually manipulating the user's own position, feeling the varying resistance feedback in the controls, and seeing the visual panorama shift in unison, the user forms a connection to the machine and feels in control. By accurately flowing through the correct combinations of the six degrees of motion in a user controlled environment the sensory and visual cues occur in unison and verify one another. Because of the simplicity of the common joystick interface with the computer, the video image is easily kept in sync with the movements of the simulator.

Thus in one embodiment of the invention all of the performance and features of this motion simulator are brought to the user's home in a compact, low cost manually operated flight simulator. In another embodiment of this invention a means is provided for a health club to enable a user to stay physically fit while experiencing a realistic flight simulation that will hold the user's attention, and make keeping fit a fun experience that the user will come back for.

This invention in all its possible embodiments will break down the barrier between high cost simulators, and the general public. Furthermore this invention has the additional advantages in that:

it permits the manual simulation of motion which drastically reduces its cost of manufacture so as to be compared to a piece of common home exercise equipment.

it eliminates the need for specialized computer equipment and software by emulating an ordinary joystick when used with a PC or gaming machine.

it can interactively change in difficulty according to the physical condition of the user.

it can provide a pleasurable experience that will make the user want to continue working out, and bring weight loss success to those that have a hard time losing weight, which helps increase their self esteem.

While my above description contains many specificity's, these should not be construed as limitations on the scope of the invention, but rather as an exemplification of the preferred embodiments thereof. Numerous modifications and variations are possible. For example motion members are not necessarily needed to cause motion but the control levers could cause the motion surface to pivot about some axis. The motion members could have actuators built in them to provide greater lift and drop. Motion members could be in tension and be made of a flexible material. The user need not be seated, but could be running on a treadmill that pivots from some position according to inputs from hand levers. The exercise devices could be anything offering resistance or repetitive motion, and added resistance can be accomplished in many ways. Thus modifications can be made to simulate most any experience and provide a motion simulation from many configurations. The body's conditions could be any pertinent information to the software like blood pressure, temperature, oxygen saturation, or galvanic skin response and not just pulse.

Accordingly, the scope of the invention should be determined not by the embodiments illustrated, but by the appended claims and their legal equivalents.

What is claimed is:

1. A manually operated motion device for use over an area having a floor, the motion device comprising:

an axial hinge member, the axial hinge member attached to a support;

a motion surface, the motion surface having three universal hinge means, the three universal hinge means on said motion surface defining corner points on a first triangle, the first triangle having:

at least two substantially equal length sides, the sides defined by a pair of lines between two universal hinge means on the motion surface, the two substantially equal length sides of the motion surface defining an angle therebetween, the angle having a vertex;

support means for supporting the first triangle in a substantially parallel relationship to the floor, the support means comprising:

a first support member attached to one universal hinge means on the motion surface, a second support member attached to one universal hinge means on the motion surface, the first and second support member arranged in a non-parallel, spaced apart relationship; and a compression member to support compression forces the compression member connecting the universal hinge means at the vertex of the angle on the motion surface to the axial hinge member, so that the compression member may move in a plane normal to the axial hinge means and passing through the vertex of the angle on the motion surface; and means for moving at least one of the support members by acting transversely on the support member, so that motion of one support member allows motion of the motion surface.

2. A manually operated motion device according to claim 1 and further comprising a seat mounted on said motion surface.

3. A manually operated motion device according to claim 2, wherein said means for moving at least one of the support members is a servomotor responsive to an electronic signal.

4. A manually operated motion device according to claim 2, wherein said means for moving at least one of the support members is a lever.

5. A manually operated motion device according to claim 4 and further comprising means for providing video simulation.

6. A manually operated motion device according to claim 5 and further comprising means for providing variable resistance to said means for moving at least one of the support members.

7. A manually operated motion device comprising:

a base, the base having a first universal hinge means for accepting a compression support member and allowing universal motion of the compression support member;

a second universal hinge means for accepting a compression support member and allowing universal motion of the compression support member; and an axial hinge means for accepting a compression support member and allowing motion of the compression support member in a single plane;

the first and the second universal hinge means and the axial hinge means arranged on said frame base to define corner points on a base triangle, the base triangle having at least two substantially equal length sides, one equal length side defined by a line between the first universal hinge means and the axial hinge means, another equal length side defined by a line between the second universal hinge means and the axial hinge means, the two substantially equal length sides defining an angle therebetween, the angle having a vertex, the axial hinge means being at the vertex of the angle;

a motion surface, the motion surface having three universal hinge means adapted for receiving a compression member, the three universal hinge means on said motion surface defining corner points on a first triangle, the first triangle having:

at least two substantially equal length sides, the sides defined by a pair of lines between two universal hinge means on the motion surface, the two substantially equal length sides of the motion surface defining an angle therebetween, the angle having a vertex;

the first triangle being supported over the base triangle by three support members for supporting compression forces, the support members arranged in a tripod configuration and including:

a first member for supporting compression forces between the first universal hinge means on the base and one universal hinge means on the motion surface, a second member for supporting compression forces between the second universal hinge means on the base and one universal hinge means on the motion surface, the first and second compression member arranged in a substantially crossed relationship; and a third member for supporting compression forces between the third universal hinge means and the third member connecting the axial hinge member on the base and the universal hinge means at the vertex of the angle on the motion surface, so that the third member may move in a plane defined by the axial hinge means and the vertex of the angle of the base and the vertex of the angle on the motion surface; and means for moving at least one of the support members between one of the universal hinge means on the base and one of the universal hinge means on the motion surface.

8. A manually operated motion device according to claim 7 and further comprising a seat mounted on said motion surface.

9. A manually operated motion device according to claim 8, wherein said means for moving at least one of the support members is a lever.

10. A manually operated motion device according to claim 9 and further comprising means for providing video simulation.

11. A manually operated motion device according to claim 10 and further comprising means for providing variable resistance to said means for moving at least one of the support members.

12. A manually operated motion device according to claim 9, wherein said means for moving at least one of the support members is a servomotor responsive to an electronic signal.

* * * * *